(12) United States Patent
Tsai et al.

(10) Patent No.: US 8,610,317 B2
(45) Date of Patent: Dec. 17, 2013

(54) COMMUNICATION CIRCUIT AND ADAPTER HAVING THE SAME

(75) Inventors: Tsung-Yuan Tsai, Fengshan (TW); Chien-Chung Hsu, Zhonghe (TW)

(73) Assignees: Lite-On Electronics (Guangzhou) Limited, Guangzhou (CN); Lite-On Technology Corporation, Taipei (TW)

( * ) Notice: Subject to any disclaimer, the term of this patent is extended or adjusted under 35 U.S.C. 154(b) by 507 days.

(21) Appl. No.: 12/959,493

(22) Filed: Dec. 3, 2010

(65) Prior Publication Data
US 2012/0069874 A1 Mar. 22, 2012

(30) Foreign Application Priority Data
Sep. 17, 2010 (CN) .......................... 2010 1 0284191

(51) Int. Cl.
*G05F 3/06* (2006.01)

(52) U.S. Cl.
USPC .......................................................... 307/151

(58) Field of Classification Search
USPC .......................................................... 307/151
See application file for complete search history.

(56) References Cited

U.S. PATENT DOCUMENTS

| | | | |
|---|---|---|---|
| 2002/0080010 A1* | 6/2002 | Zhang | 340/310.06 |
| 2004/0207263 A1* | 10/2004 | Yanagida et al. | 307/10.1 |
| 2005/0137813 A1* | 6/2005 | Swarztrauber et al. | 702/62 |

* cited by examiner

Primary Examiner — Robert L. Deberadinis
(74) Attorney, Agent, or Firm — Li&Cai Intellectual Property (USA) Office

(57) ABSTRACT

A communication circuit and an adapter having the same are provided. The communication circuit includes a coupling circuit and a transceiver module. The coupling circuit is coupled to a DC power line of the adapter to filter a first modulation signal carried on the DC power line or to couple a second modulation signal to the DC power line. The transceiver module is used to receive and demodulate the first modulation signal from the coupling circuit or to output the second modulation signal to the coupling circuit. The adapter is capable of transmitting data and power through the same DC power line.

21 Claims, 2 Drawing Sheets

COMMUNICATION CIRCUIT AND ADAPTER HAVING THE SAME

BACKGROUND OF THE INVENTION

1. Field of the Invention

The present invention relates to a communication technology of adapter; in particular, to a communication circuit and an adapter using the same enabling communications and data transmissions directly on a DC power line.

2. Description of Related Art

The adapter is an interface converter applied to convert different interfaces thereby allowing electronic devices of various interfaces to interconnect, or alternatively enabling the connection of an electronic device to another interface, such as a power adapter or a USB adapting apparatus etc. The power adapter is essentially employed to convert alternating current (AC) power to direct current (DC) power, or vice versa, and provide converted DC power to a connected electronic device for use. The adapter is capable of converting various AC powers (e.g., 110V or 220V) to a stable DC power such that the electronic device is applicable in different areas or countries.

Generally, a conventional power adapter is not equipped with the data transmission function; whereas, as the role of power management becoming more and more significant, notebook computers usually need to further appreciate relevant information concerning power supply thereby facilitating power management, so certain new types of power adapters are now additionally configured with the data transmission function which also improves convenience in product inspection during manufacture processes. However, the specification and design of data lines in each adapter may vary, which causes complicated communication circuit designs between the notebook computer and the adapter.

Besides, adding one extra data line may increase the number of transmission lines for the adapter from two to three. Since a 3-lined cable has a greater diameter and is less durable for bending or winding, the use of such a type of cable may be inconvenient. Also, the design for 3-line based adapters from each vendor differs, resulting in complex and impractical transmission interfaces between the notebook computer and the adapter.

SUMMARY OF THE INVENTION

The present invention discloses a communication circuit and adapter having the same, in which the communication circuit according to the present invention is applicable for transferring data on a power line such that the adapter and a notebook computer are allowed to perform bidirectional communications. Since the adapter requires no extra data lines, so that a simple structure and low design cost are achieved.

The present invention provides a communication circuit applicable for communications between a notebook computer and an adapter, wherein the circuit includes a coupling circuit and a transceiver module. The coupling circuit is coupled to a direct current (DC) power line of the adapter for filtering a first modulation signal carried on the DC power line or coupling a second modulation signal to the DC power line. The transceiver module is coupled to the coupling circuit and is used to receive and demodulate the first modulation signal from the coupling circuit or to output the second modulation signal to the coupling circuit. Since the communication circuit is able to receive and transfer data signal directly through the DC power line by means of the coupling circuit, the DC power line enables both data and power transmission functions, and the transmission line of the adapter having the present communication circuit requires no additional data lines to provide the data transmission function which features a simpler structure and lower design costs.

The communication circuit according to the present invention can be directly integrated into the power adapter thus allowing the power adapter to communicate with a computer or a notebook computer connected thereto. Said adapter essentially comprises a power conversion unit and the aforementioned communication circuit, in which the power conversion unit is used to convert alternating current (AC) into direct current (DC) and feed the converted DC power to the notebook computer via the DC power line. The communication circuit is coupled to the DC power line and communicates with the notebook computer through the DC power line.

In an embodiment of the present invention, the coupling circuit includes a band pass filter and a first capacitor. A first terminal of the band pass filter is coupled to the output terminal of the transceiver module. The first capacitor is coupled between a second terminal of the band pass filter and the DC power line. The band pass filter can be for example a T-typed band pass filter or a π-typed band pass filter.

In an embodiment of the present invention, the aforementioned transceiver module includes a mixer, a first power amplifier and a second power amplifier. The mixer is used to demodulate the first modulation signal or to modulate a digital signal for outputting the second modulation signal. The first power amplifier has an input terminal coupled to the mixer and an output terminal coupled to the coupling circuit. The second power amplifier has an input terminal coupled to the coupling circuit and an output terminal coupled to the mixer.

In another embodiment of the present invention, the transceiver module includes a decoding unit, an encoding unit and a mixer. The decoding unit is coupled to the coupling circuit for decoding the first modulation signal. The encoding unit is coupled to the coupling circuit for outputting the second modulation signal, while the mixer is coupled to the decoding unit and the encoding unit.

In summary of the aforementioned general descriptions, the communication circuit proposed by the present invention can be integrated into a power adapter and a notebook computer such that the power adapter and the notebook computer is able to directly communicate by way of a DC power line without installation of any additional data line. The communication circuit according to the present invention features a compact structure and reduced design costs, suitable for applications on a variety of electronic devices requiring performance of data transmissions on a DC power line.

For better understanding the characteristics and advantages of the present invention as illustrated hereinbefore, certain embodiments are specifically provided in the following texts, conjunctively with appended drawings thereof, in order to further explain the present invention in details.

DETAILED DESCRIPTION OF THE PREFERRED EMBODIMENTS (First Embodiment)

Figure 1:
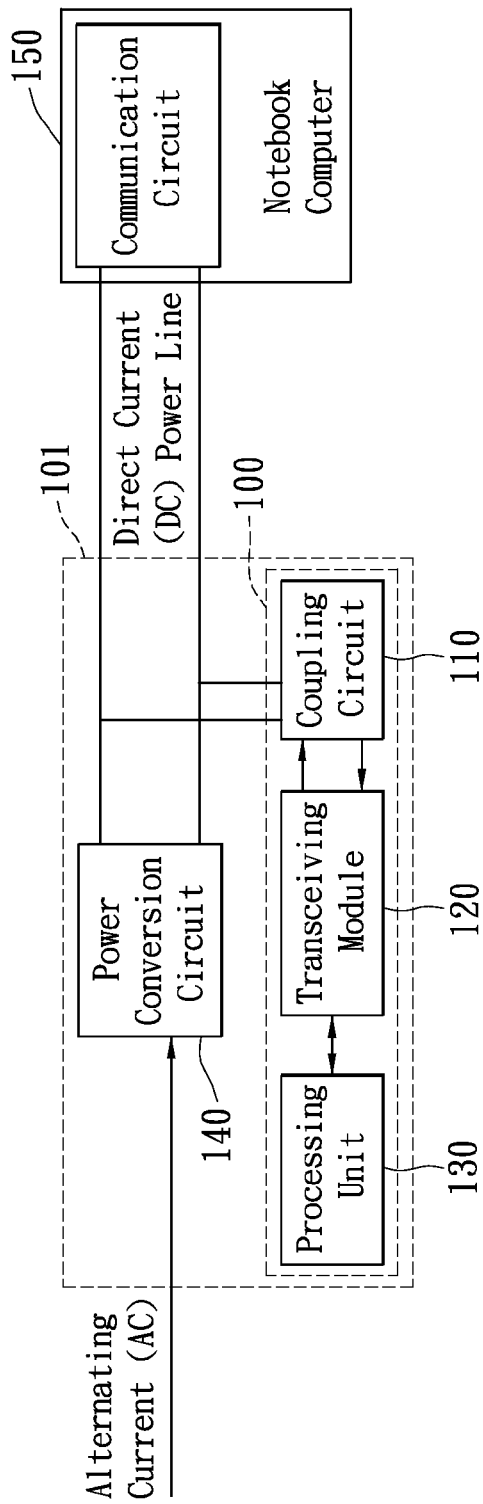
FIG. 1 shows a diagram of an adapter according to a first embodiment of the present invention.

FIG. 1 shows a diagram of an adapter according to a first embodiment of the present invention. The adapter 101 can be used to connect alternating current (AC) power and a notebook computer 150, convert AC power into direct current (DC) power and feed the converted DC power to the notebook computer 150 for use. The adapter 101 includes a power conversion unit 140 and a communication circuit 100, both of which being coupled to a DC power line. The power conversion unit 140 converts AC power into DC power and then feeds the converted DC power to the notebook computer 150 through the DC power line. The communication circuit 100 includes a coupling circuit 110, a transceiver module 120 and a processing unit 130, in which the transceiver module 120 is coupled between the processing unit 130 and the coupling circuit 110. The communication circuit 100 can also perform bidirectional communications with the notebook computer 150 by way of the DC power line. That is, the DC power line in the present embodiment has two functions of power and data transmission.

The coupling circuit 110 is coupled to the DC power line of the adapter 101 for filtering a first modulation signal carried on the DC power line or to couple a second modulation signal to the DC power line. The DC power line is essentially used to transfer DC power, and the structure thereof may be for example a 2-lined cable, one of which being the positive pole while the other one being ground; however, the present invention is not limited to any specific cable structure of the DC power line. The transceiver module 120 is coupled to the coupling circuit 110 for receiving and demodulating the first modulation signal or for outputting the second modulation signal to the coupling circuit 110.

Figure 2:
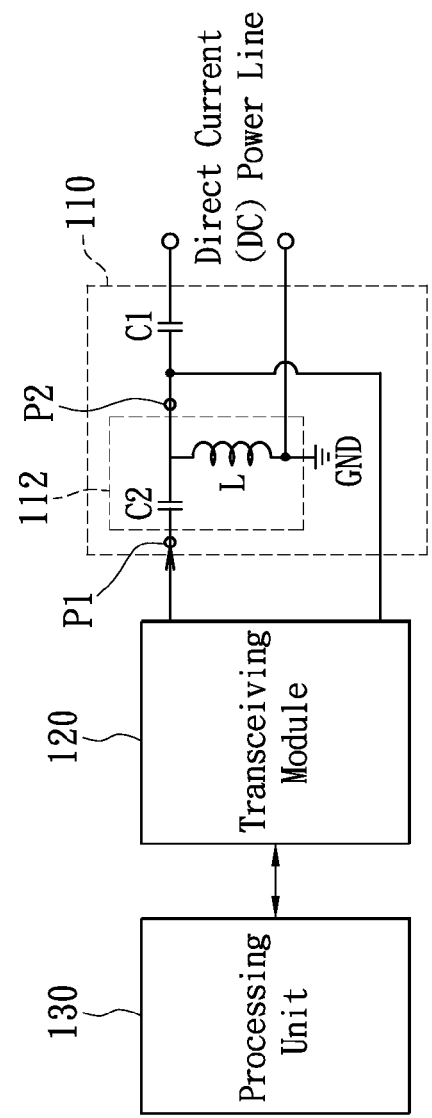
FIG. 2 shows a diagram of the coupling circuit 110 in the first embodiment of the present invention.

Refer next to FIG. 2, wherein a diagram of the coupling circuit 110 in the first embodiment of the present invention is shown. The coupling circuit 110 includes a first capacitor C1 and a band pass filter 112, in which the band pass filter 112 includes a second capacitor C2 and an inductor L. The first capacitor C1 is coupled between the second terminal P2 of the band pass filter 112 and the DC power line (positive line), the second capacitor C2 is coupled between the first terminal P1 and the second terminal P2 of the band pass filter 112, and the inductor L is coupled between the second terminal P2 of the band pass filter 112 and a ground terminal GND. The first capacitor C1 can be used to filter the DC voltage on the DC power line, and the band pass filter 112 is for filtering the required band signal, i.e., the first modulation signal. The transceiver module 120 is coupled to the first terminal P1 and the second terminal P2 of the band pass filter 112 to receive the first modulation signal and output a second modulation signal. It should be noted that the aforementioned the band pass filter 112 can be implemented as a T-typed band pass filter or a π-typed band pass filter, and the present invention is not limited thereto.

Figure 3:
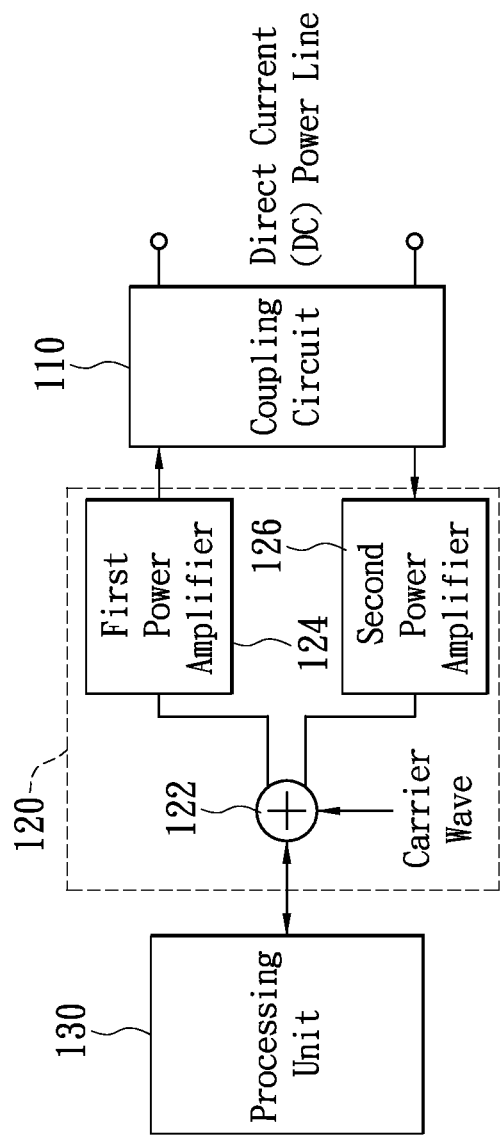
FIG. 3 shows a diagram of the transceiver module 120 in the first embodiment of the present invention.

The function of the transceiver module 120 is essentially to demodulate the received first modulation signal and then transfer it to the processing unit 130 for subsequent processes, or alternatively to modulate the digital signal from the processing unit 130. Refer next to FIG. 3, wherein a diagram of the transceiver module 120 in the first embodiment of the present invention is shown. The transceiver module 120 includes a mixer 122, a first power amplifier 124 and a second power amplifier 126, in which the input terminal of the first power amplifier 124 is coupled to the mixer 122 while the output terminal thereof is coupled to the coupling circuit 110. The input terminal of the second power amplifier 126 is coupled to the coupling circuit 110 and the output terminal thereof is coupled to the mixer 122. The first power amplifier 124 is used to amplify the power of the second modulation signal to be outputted, and the second power amplifier 126 is to amplify the power of the received first modulation signal.

The mixer 122 may operate to demodulate the first modulation signal, or modulate the digital signal from the processing unit 130 thereby outputting the second modulation signal to the first power amplifier 124. The mixer 122 can be used to combine the digital signal with the carrier wave for generating the second modulation signal, or otherwise removing the carrier wave from the first modulation signal thereby generating the digital signal. In other words, the mixer is principally used for frequency up-conversion in modulations or frequency down-conversion in demodulations. The mixer 122 can utilize, for example, the non-linear feature of diode or transistor such that a second-order or third-order or even higher-order term may exist in the output response to generate the sum-and-difference term of different frequencies thereby achieving the effect of frequency up-conversion or frequency down-conversion. The first power amplifier 124 and the second power amplifier 126 are mainly used for signal amplifications; whereas, in another embodiment of the present invention, such components can be well replaced by using the low noise amplifier (LNA), and the present invention is not limited thereto.

It is apparent from the above-illustrated descriptions that the adapter 101 is internally configured with the communication circuit 100 which thus allows to transfer or receive signals through the DC power line, and a communication circuit 160 including a similar circuit structure as the one installed inside the communication circuit 100 can be also configured in the notebook computer 150 to perform data transmissions with the communication circuit 100. Through descriptions of the aforementioned embodiment, those skilled in the art can deduce other implementations, and the description is omitted.

(Second Embodiment)

Figure 4:
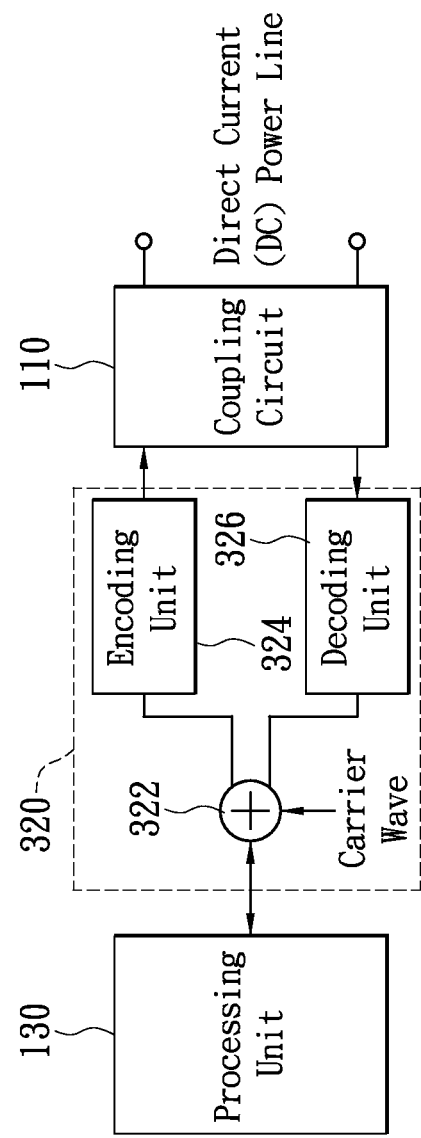
FIG. 4 shows a diagram of a transceiver module according to a second embodiment of the present invention.

Subsequently, in conjunction with FIGS. 1 and 3, now refer to FIG. 4, wherein a diagram of a transceiver module according to a second embodiment of the present invention is shown. Herein the transceiver module 320 includes a mixer 322, an encoding unit 324 and a decoding unit 326, in which the encoding unit 324 and the decoding unit 326 are respectively coupled between the mixed 322 and the coupling circuit 110. The encoding unit 324 is used to encode the output from the mixer 322 for generating a second modulation signal, and the decoding unit 326 is used to decode a first modulation signal received from the coupling circuit 110. The function of the mixer 322 is similar to the mixer 122 as shown in FIG. 3 which are both applied for frequency up-conversion or frequency down-conversion, and descriptions thereof are herein omitted for brevity. The encoding unit 324 and the decoding unit 326 can be for example a Dual Tone Multi-Frequency (DTMF) encoder and a DTMF decoder, but the present invention is not limited thereto.

Furthermore, it should be noted that the digital signal outputted by the processing unit 130 as shown in FIGS. 1 to 4 can be compliant with the Power Management Bus (PMBus) communication protocol for performing communications between the adapter 101 and the notebook computer 150 under the protocol, but the present invention is not limited thereto. The transceiver module 120 in FIG. 1 can be implemented by means of a wireless transceiver module architecture or any frequency modulation/demodulation unit or frequency modulation chip, whose codec technology applied therein can be Frequency-Shift Keying (FSK), Amplitude-Shift Keying (ASK), On-Off Keying (OOK), Multiple Frequency-Shift Keying (MFSK) or DTMF modulation or Phase-Shift Keying (PSK) or any other communication modulation technologies, and the present invention is not limited to any specific architecture of the transceiver module 120 and modulation technology applied therein.

The processing unit 130 as shown in FIGS. 1 to 4 can be implemented by an additional microprocessor, Complex Programmable Logic Device (CPLD) or the original processor in the electronic device, and the present invention is not limited thereto. The aforementioned communication circuit 100 can be applied to any type of power adapter or electronic device which is required to perform data transmissions on the DC power line, such as a computer or a power supply, and the present invention does not restrict application fields of the communication circuit 100.

Additionally, it should be noted that the coupling relationship between the above-said components can be a direct electrical connection, an indirect electrical connection or both, so long as the required function of electrical signal transmission can be effectively achieved and the present invention is not limited thereto.

In summary, the communication circuit according to the present invention can receive or transfer signals on a 2-lined DC power line thereby enabling the DC power line with both power and data transmission features. The adapter configured with such a communication circuit can directly communicate with a notebook computer without any influence caused by DC power transmissions.

While the preferred embodiments of the present invention have been disclosed as above, the present invention is by no means limited to any of such preferred embodiments. Changes, modifications and substitutions can be made by those skilled ones in relevant technical fields without departing from the scope of the present invention as herein disclosed. Therefore, the scope of the present invention to be legally protected should be defined only by the following claims.

What is claimed is:

1. A communication circuit suitable for communications between a notebook computer and an adapter, the communication circuit comprising:
   a coupling circuit coupled to a 2-lined and direct current power line of the adapter for filtering a first modulation signal carried on the 2-lined and direct current power line or coupling a second modulation signal to the 2-lined direct current power line; and
   a transceiver module coupled to the coupling circuit for receiving and demodulating the first modulation signal from the coupling circuit or for outputting the second modulation signal to the coupling circuit.

2. The communication circuit according to claim 1, wherein the coupling circuit comprises:
   a band pass filter having a first terminal coupled to an output terminal of the transceiver module; and
   a first capacitor coupled between a second terminal of the band pass filter and the 2-lined and direct current power line.

3. The communication circuit according to claim 2, wherein the band pass filter comprises:
   a second capacitor coupled between the output terminal of the transceiver module and the second terminal of the band pass filter; and
   an inductor coupled between the second terminal of the band pass filter and a ground terminal.

4. The communication circuit according to claim 2, wherein the band pass filter is a T-typed band pass filter or a π-typed band pass filter.

5. The communication circuit according to claim 1, wherein the transceiver module comprises:
   a mixer for demodulating the first modulation signal or for modulating a digital signal to output the second modulation signal;
   a first power amplifier having an input terminal coupled to the mixer and an output terminal coupled to the coupling circuit; and
   a second power amplifier having an input terminal coupled to the coupling circuit and an output terminal coupled to the mixer.

6. The communication circuit according to claim 1, wherein the transceiver module comprises:
   a decoding unit coupled to the coupling circuit for decoding the first modulation signal;
   an encoding unit coupled to the coupling circuit for outputting the second modulation signal; and
   a mixer coupled to the decoding unit and the encoding unit.

7. The communication circuit according to claim 6, wherein the decoding unit is a Dual Tone Multi-Frequency decoder and the encoding unit is a Dual Tone Multi-Frequency encoder.

8. The communication circuit according to claim 1, wherein the transceiver module comprises a frequency modulation/demodulation unit for demodulating the first modulation signal or for modulating a digital signal thereby generating the second modulation signal.

9. The communication circuit according to claim 1, wherein the second modulation signal is formed by modulating a digital signal compliant with the Power Management Bus communication protocol.

10. The communication circuit according to claim 1, further comprising:
    a processing unit coupled to the transceiver module.

11. An adapter suitable for connection to a notebook computer, the adapter comprising:
    a power conversion unit for converting an alternating current power into a direct current power and feeding the converted direct current power to the notebook computer via a 2-lined and direct current power line; and
    a communication circuit coupled to the 2-lined and direct current power line for communicating with the notebook computer, the communication circuit comprising:
    a coupling circuit coupled to the 2-lined and direct current power line of the adapter for filtering a first modulation signal carried on the 2-lined and direct current power line or coupling a second modulation signal to the 2-lined and direct current power line; and
    a transceiver module coupled to the coupling circuit for receiving and demodulating the first modulation signal or for outputting the second modulation signal to the coupling circuit.

12. The adapter according to claim 11, wherein the coupling circuit comprises:
    a band pass filter having a first terminal coupled to an output terminal of the transceiver module; and
    a first capacitor coupled between a second terminal of the band pass filter and the 2-lined and direct current power line.

13. The adapter according to claim 12, wherein the band pass filter comprises:

a second capacitor coupled between the output terminal of the transceiver module and the second terminal of the band pass filter; and an inductor coupled between the second terminal of the band pass filter and a ground terminal.

14. The adapter according to claim 12, wherein the band pass filter is a T-typed band pass filter or a π-typed band pass filter.

15. The adapter according to claim 11, wherein the transceiver module comprises:

a mixer for demodulating the first modulation signal or for modulating a digital signal to output the second modulation signal;

a first power amplifier having an input terminal coupled to the mixer and an output terminal coupled to the coupling circuit; and a second power amplifier having an input terminal coupled to the coupling circuit and an output terminal coupled to the mixer.

16. The adapter according to claim 11, wherein the transceiver module comprises:

a decoding unit coupled to the coupling circuit for decoding the first modulation signal;

an encoding unit coupled to the coupling circuit for outputting the second modulation signal; and a mixer coupled to the decoding unit and the encoding unit.

17. The adapter according to claim 16, wherein the decoding unit is a Dual Tone Multi-Frequency decoder and the encoding unit is a Dual Tone Multi-Frequency encoder.

18. The adapter according to claim 11, wherein the transceiver module comprises a frequency modulation/demodulation unit for demodulating the first modulation signal or for modulating a digital signal thereby generating the second modulation signal.

19. The adapter according to claim 11, wherein the second modulation signal is formed by modulating a digital signal compliant with the Power Management Bus communication protocol.

20. The adapter according to claim 11, wherein the communication circuit further comprises:

a processing unit coupled to the transceiver module.

21. The adapter according to claim 11, wherein the notebook computer connected to the adapter comprises a second communication circuit having a structure substantially identical to the communication circuit for performing communications with the communication circuit.

* * * * *